United States Patent
Lan et al.

(10) Patent No.: US 12,530,243 B2
(45) Date of Patent: Jan. 20, 2026

(54) RESOURCE ADJUSTMENT METHOD AND APPARATUS

(71) Applicant: Huawei Cloud Computing Technologies Co., Ltd., Guizhou (CN)

(72) Inventors: Qinglong Lan, Beijing (CN); Yu Zhang, Beijing (CN)

(73) Assignee: HUAWEI CLOUD COMPUTING TECHNOLOGIES, Guizhou (CN)

( * ) Notice: Subject to any disclaimer, the term of this patent is extended or adjusted under 35 U.S.C. 154(b) by 875 days.

(21) Appl. No.: 17/839,999

(22) Filed: Jun. 14, 2022

(65) Prior Publication Data

US 2022/0308928 A1 Sep. 29, 2022

Related U.S. Application Data

(63) Continuation of application No. PCT/CN2020/128331, filed on Nov. 12, 2020.

(30) Foreign Application Priority Data

Dec. 16, 2019 (CN) .......................... 201911296415.7

(51) Int. Cl.
   *G06F 9/50* (2006.01)

(52) U.S. Cl.
   CPC .......... *G06F 9/5083* (2013.01); *G06F 9/5016* (2013.01); *G06F 9/5027* (2013.01)

(58) Field of Classification Search
   CPC ..... G06F 9/5027; G06F 9/5016; G06F 9/5083
   See application file for complete search history.

(56) References Cited

U.S. PATENT DOCUMENTS

| 8,806,487 B2* | 8/2014 | Zhang | G06F 9/5083 718/1 |
| 2015/0026681 A1 | 1/2015 | Lin et al. | |
| 2016/0205048 A1* | 7/2016 | Zhu | H04L 49/70 370/409 |
| 2017/0149888 A1* | 5/2017 | Tasoulas | H04L 67/1095 |

(Continued)

FOREIGN PATENT DOCUMENTS

| CN | 103346981 A | 10/2013 |
| CN | 103793278 A | 5/2014 |

(Continued)

OTHER PUBLICATIONS

Michio Honda et al., "mSwitch a highly-scalable, modular software switch," Hot Topics in Middleboxes and Network Function Virtualization, ACM, 2 Penn Plaza, Suite 701 New York NY 10121-0701 USA, 17 Jun. 17, 2015, XP058513677, 13 pages.

(Continued)

*Primary Examiner* — Jacob D Dascomb
(74) *Attorney, Agent, or Firm* — Conley Rose, P.C.

(57) ABSTRACT

A resource adjustment method includes determining a resource adjustment quantity when creating a first virtual port or deleting a second virtual port on a server, where the resource adjustment quantity is a to-be-adjusted value of a resource occupied by a virtual switch (vSwitch) on the server, where the first virtual port is a to-be-created virtual port between the vSwitch and a first virtual machine, and where the second virtual port is a to-be-deleted virtual port between the vSwitch and a second virtual machine on the server.

20 Claims, 3 Drawing Sheets

(56) References Cited

U.S. PATENT DOCUMENTS

| | | |
|---|---|---|
| 2017/0153906 A1 | 6/2017 | Bektas et al. |
| 2018/0183659 A1 | 6/2018 | Macnamara et al. |
| 2018/0324106 A1 | 11/2018 | Billore et al. |
| 2018/0359162 A1* | 12/2018 | Savov ................ H04L 41/5051 |
| 2019/0190892 A1* | 6/2019 | Menachem ........... G06F 21/602 |
| 2020/0034075 A1* | 1/2020 | Li .......................... G06F 3/0634 |
| 2020/0097310 A1* | 3/2020 | Shukla .................. G06F 9/5077 |
| 2022/0308928 A1 | 9/2022 | Lan et al. |

FOREIGN PATENT DOCUMENTS

| | | |
|---|---|---|
| CN | 103870332 A | 6/2014 |
| CN | 105589744 A | 5/2016 |
| CN | 106383736 A | 2/2017 |
| CN | 111158905 A | 5/2020 |

OTHER PUBLICATIONS

"Intel DPDK vSwitch Getting Started Guide," Jun. 1, 2013, pp. 1-20, XP055973617, 20 pages.

\* cited by examiner

RESOURCE ADJUSTMENT METHOD AND APPARATUS

CROSS-REFERENCE TO RELATED APPLICATIONS

This is a continuation of International Patent Application No. PCT/CN2020/128331 filed on Nov. 12, 2020, which claims priority to Chinese Patent Application No. 201911296415.7 filed on Dec. 16, 2019. The disclosures of the aforementioned applications are hereby incorporated by reference in their entireties.

TECHNICAL FIELD

This disclosure relates to the computer field, and more specifically, to a resource adjustment method and apparatus in the computer field.

BACKGROUND

A virtual switch (vSwitch) runs in an operating system of a server as an Ethernet switch for a virtual network, to provide an external port for a virtual machine. The vSwitch is implemented by software and has flexible functions, but occupies a fixed central processing unit (CPU) resource and a fixed memory resource of the server. With development of network adapter capabilities and an increase in service bandwidth requirements, occupation of the CPU resource and the memory resource of the server by the vSwitch directly affects resource utilization of the virtual machine on the server.

SUMMARY

This disclosure provides a resource adjustment method and apparatus, to improve resource utilization on a server.

According to a first aspect, a resource adjustment method is provided, including: determining a resource adjustment quantity when creating a first virtual port or deleting a second virtual port on a server, where the resource adjustment quantity is a to-be-adjusted value of a resource occupied by a vSwitch on the server, the first virtual port is a to-be-created virtual port between the vSwitch and a first virtual machine, the second virtual port is a to-be-deleted virtual port between the vSwitch and a second virtual machine on the server, and the first virtual machine is an existing virtual machine on the server or a to-be-created virtual machine on the server; and sending the resource adjustment quantity to the server.

Therefore, according to the resource adjustment method provided in an embodiment of this disclosure, the resource occupied by the vSwitch on the server can be dynamically adjusted, to prevent the vSwitch from occupying a fixed resource of the server. This can improve resource utilization on the server.

Optionally, one or more virtual ports may be created, or one or more virtual ports may be deleted.

Optionally, the first virtual machine is a to-be-created virtual machine on the server or a virtual machine that has been created on the server. When the first virtual machine is the to-be-created virtual machine, the first virtual port is a virtual port required when the first virtual machine is created. When the first virtual machine is the virtual machine that has been created on the server, the first virtual port is created to dynamically adjust a quantity of virtual ports between the first virtual machine and the vSwitch.

Optionally, the second virtual machine is a to-be-deleted virtual machine on the server or a virtual machine that does not need to be deleted on the server. When the second virtual machine is the to-be-deleted virtual machine, the second virtual port is a virtual port that needs to be deleted when the second virtual machine is deleted. When the second virtual machine is the virtual machine that does not need to be deleted on the server, the second virtual port is deleted to dynamically adjust a quantity of virtual ports between the second virtual machine and the vSwitch.

In some possible implementations, the determining a resource adjustment quantity includes: obtaining a first resource currently occupied by the vSwitch on the server; determining a second resource to be occupied by the vSwitch on the server when creating the first virtual port or deleting the second virtual port on the server; and determining the resource adjustment quantity based on the first resource and the second resource.

Optionally, when the first virtual port or the first virtual machine is created on the server, the second resource is greater than the first resource. In this case, the resource adjustment quantity is a difference between the second resource and the first resource. In other words, in this case, the server needs to increase the resource occupied by the vSwitch. For example, when the vSwitch currently occupies a resource of 1 virtual CPU (vCPU), and a virtual port of 2 gigabits per second (Gbps) is added, the vSwitch needs to reach a forwarding rate of 7 Gbps. In this case, a resource of 2 vCPUs is required, and the resource adjustment quantity is 1 vCPU.

Optionally, when the second virtual port or the second virtual machine is deleted on the server, the first resource is greater than the second resource. In this case, the server needs to reduce the resource occupied by the vSwitch, without a need to determine whether total resources of the server are enough. For example, when the vSwitch currently occupies a resource of 3 vCPUs, and a virtual port of 2 Gbps is reduced, the vSwitch needs to reach a forwarding rate of 4 Gbps. In this case, a resource of 2 vCPUs is required, and the resource adjustment quantity is 1 vCPU. In other words, the resource occupied by the vSwitch needs to be reduced by 1 vCPU.

In some possible implementations, the first virtual machine is the to-be-created virtual machine, and before the determining the resource adjustment quantity based on the first resource and the second resource, the method further includes: determining that the total resources of the server are enough for a resource occupied by the first virtual machine when the first virtual machine is created and a resource occupied by the vSwitch when the first virtual machine is created.

Optionally, the resource adjustment quantity is sent to the server if the total resources of the server are enough for the resource occupied by the first virtual machine when the first virtual machine is created and the resource occupied by the vSwitch when the first virtual machine is created. If the total resources of the server are not enough for the resource occupied by the first virtual machine when the first virtual machine is created and the resource occupied by the vSwitch when the first virtual machine is created, the resource adjustment quantity is not sent to the server, and the server with total sources that are enough for the resource occupied by the first virtual machine when the first virtual machine is created and the resource occupied by the vSwitch when the first virtual machine is created is selected again.

In some possible implementations, the determining that total resources of the server are enough for a resource occupied by the first virtual machine when the first virtual machine is created and a resource occupied by the vSwitch when the first virtual machine is created includes: determining that the total resources of the server are enough for a sum of resources currently occupied by an existing virtual machine on the server, the resource occupied by the first virtual machine when the first virtual machine is created, and a resource that is occupied by the vSwitch and that needs to be increased when the first virtual machine is created, where the existing virtual machine refers to a virtual machine that has been created on the server.

The resources that are currently occupied by the existing virtual machine and that are of the server include a first resource occupied by the vSwitch when the existing virtual machine is created and a resource occupied by the existing virtual machine when the existing virtual machine is created.

In some possible implementations, the determining a second resource to be occupied by the vSwitch on the server when creating the first virtual port or deleting the second virtual port on the server includes: when creating the first virtual port or deleting the second virtual port on the server, determining, based on a mapping relationship, the second resource occupied by the vSwitch on the server, where the mapping relationship is used to indicate a correspondence between the resource occupied by the vSwitch and a performance parameter of the vSwitch.

For example, the mapping relationship is preset or specified.

In some possible implementations, the server supports a single-root input/output virtualization (SR-IOV) network technology. In this way, in a case in which the SR-IOV network technology coexists with the vSwitch, a resource waste that occurs because the vSwitch occupies the fixed resource of the server can be avoided. The resource occupied by the vSwitch on the server can be dynamically adjusted based on an actual requirement when the first virtual port is created or the second virtual port is deleted, so that flexibility of resource use can be improved, and resource utilization is improved.

According to a second aspect, a resource adjustment method is provided, including: receiving, by a server, a resource adjustment quantity; and adjusting, by the server, a resource occupied by a vSwitch on the server based on the resource adjustment quantity.

In some possible implementations, the resource adjustment quantity is determined based on a first resource currently occupied by the vSwitch on the server and a second resource to be occupied by the vSwitch when a virtual port is created or deleted on the server.

In some possible implementations, the server supports an SR-IOV network technology.

According to a third aspect, this disclosure provides a resource adjustment apparatus, configured to implement the method according to any one of the first aspect and/or the possible implementations of the first aspect. The apparatus may be a management node, or may be an apparatus in a management node, or may be an apparatus that can be used together with a management node. In a design, the apparatus may include a module corresponding to performing the method/operation/step/action described in any one of the first aspect and/or the possible implementations of the first aspect. The module may be implemented by a hardware circuit, software, or a combination of a hardware circuit and software. In a design, the apparatus may include a processing unit and an input/output unit.

According to a fourth aspect, this disclosure provides a resource adjustment apparatus, configured to implement the method according to any one of the second aspect and/or the possible implementations of the second aspect. The apparatus may be a server, or an apparatus in a server, or an apparatus that can be used together with a server. In a design, the apparatus may include a module corresponding to performing the method/operation/step/action described in any one of the second aspect and/or the possible implementations of the second aspect. The module may be implemented by a hardware circuit, software, or a combination of a hardware circuit and software. In a design, the apparatus may include a processing unit and an input/output unit.

According to a fifth aspect, this disclosure provides an apparatus. The apparatus includes a processor, configured to implement the method described in any one of the first aspect and/or the possible implementations of the first aspect. The apparatus may further include a memory, the memory is coupled to the processor, and the processor is configured to implement the method described in any one of the first aspect and/or the possible implementations of the first aspect. Optionally, the memory is configured to store instructions, and when executing the instructions stored in the memory, the processor may implement the method described in any one of the first aspect and/or the possible implementations of the first aspect. The apparatus may further include an input/output interface. The input/output interface is used by the apparatus to communicate with another device. For example, the input/output interface may be a transceiver, a circuit, a bus, a module, a pin, or an interface of another type.

According to a sixth aspect, this disclosure provides an apparatus. The apparatus includes a processor, configured to implement the method described in any one of the second aspect and/or the possible implementations of the second aspect. The apparatus may further include a memory, the memory is coupled to the processor, and the processor is configured to implement the method described in any one of the second aspect and/or the possible implementations of the second aspect. Optionally, the memory is configured to store instructions, and when executing the instructions stored in the memory, the processor may implement the method described in any one of the second aspect and/or the possible implementations of the second aspect. The apparatus may further include an input/output interface, and the input/output interface is used by the apparatus to communicate with another device. For example, the input/output interface may be a transceiver, a circuit, a bus, a module, a pin, or another type of interface.

According to a seventh aspect, this disclosure provides a resource adjustment system, where the system includes the apparatus provided in the third aspect and the apparatus provided in the fourth aspect.

Alternatively, the system includes the apparatus provided in the fifth aspect and the apparatus provided in the sixth aspect.

According to an eighth aspect, this disclosure provides a computer-readable storage medium. The computer-readable storage medium stores computer instructions. When the computer instructions are run on a computer, the computer is enabled to perform the method according to any one of the first aspect and the possible designs of the first aspect.

According to a ninth aspect, this disclosure provides a computer-readable storage medium. The computer-readable storage medium stores computer instructions. When the computer instructions are run on a computer, the computer is enabled to perform the method according to any one of the second aspect and the possible designs of the second aspect.

According to a tenth aspect, this disclosure provides a chip, including a processor. The processor is configured to perform the method in any one of the first aspect and the possible implementations of the first aspect.

Optionally, the chip further includes a memory, and the memory is coupled to the processor.

Further, optionally, the chip further includes a communication interface.

According to an eleventh aspect, this disclosure provides a chip, including a processor. The processor is configured to perform the method in any one of the second aspect and the possible implementations of the second aspect.

Optionally, the chip further includes a memory, and the memory is coupled to the processor.

Further, optionally, the chip further includes a communication interface.

According to a twelfth aspect, this disclosure provides a computer program product. The computer program product includes computer program code. When the computer program code is run on a computer, the computer is enabled to perform the method according to any one of the first aspect and the possible designs of the first aspect.

According to a thirteenth aspect, this disclosure provides a computer program product. The computer program product includes computer program code. When the computer program code is run on a computer, the computer is enabled to perform the method according to any one of the second aspect or the possible implementations of the second aspect.

DESCRIPTION OF EMBODIMENTS

The following describes technical solutions of this disclosure with reference to accompanying drawings.

Figure 1:
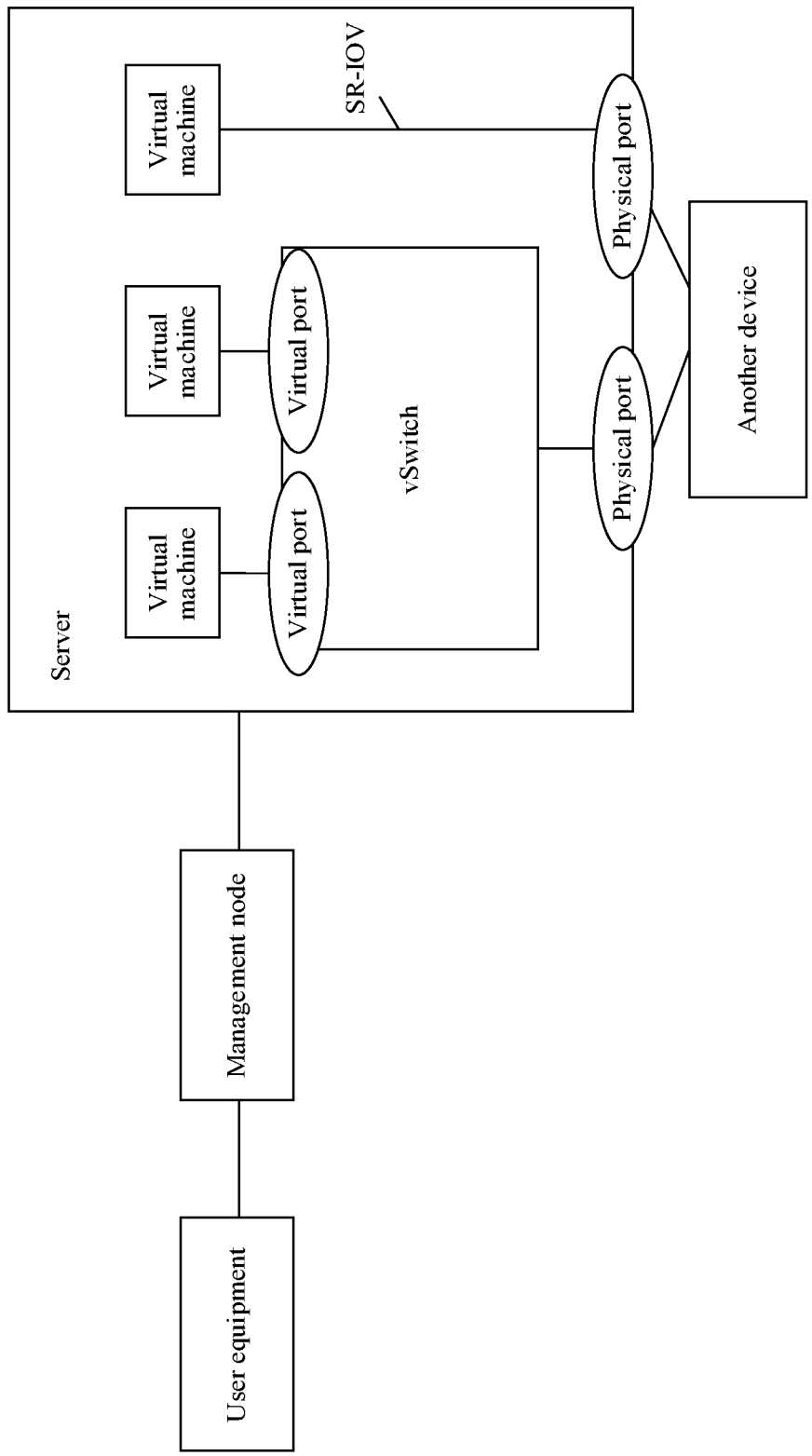
FIG. 1 is a schematic diagram of a system architecture according to an embodiment of this disclosure.

FIG. 1 is a schematic diagram of a system architecture according to an embodiment of this disclosure.

When a virtual port is created, user equipment may send, to a management node, a request message for requesting to create the virtual port. The management node determines, based on the request of the user equipment, whether a resource in a server meets a requirement for creating the virtual port. If the resource meets the requirement for creating the virtual port, the management node creates the virtual port on the server. The management node may send information such as a virtual port type, a network identifier (ID) to which the virtual port belongs, and a tenant to which the virtual port belongs to the server.

The management node may be OPENSTACK, CLOUDSTACK, or the like, and the management node is configured to manage one or more servers.

The server may also be referred to as a host, and is configured to provide a physical resource, for example, a CPU resource, a memory resource, and a network adapter for a virtual machine. There may be a plurality of servers in the schematic diagram shown in FIG. 1. One or more virtual machines (for example, a first virtual machine) may be created on one server. One or more virtual ports may be created when the virtual machine is created. A port that connects the virtual machine to a vSwitch is referred to as the virtual port. In FIG. 1, only an example in which one virtual machine corresponds to one virtual port is used. However, actually, one virtual machine may be connected to the vSwitch via a plurality of virtual ports. A port that connects the server to another device (another server or switch) is referred to as a physical port, and there may be one or more physical ports.

As shown in FIG. 1, when the virtual machine is connected to the physical port, packet switching may be performed by using an SR-IOV technology, or packet switching may be performed by using a vSwitch technology. The vSwitch is implemented by software and is flexible, but occupies a fixed CPU resource and a fixed memory resource of the server. With an increase of virtual machines on the server, the virtual machines require more resources. However, occupation of the fixed CPU resource and the fixed memory resource of the server by the vSwitch directly affects resource utilization on the server. The virtual machine can be directly connected to the physical port through SR-IOV. The vSwitch does not consume the CPU resource or the memory resource and has good performance, but has poor flexibility.

It should be noted that, when the virtual machine is connected to the physical port, only the SR-IOV technology or only the vSwitch technology may be used. Generally, to balance flexibility and performance, both the vSwitch technology and the SR-IOV technology may be used. The vSwitch technology and the SR-IOV technology occupy different physical ports. When establishing a virtualization platform or a cloud platform, an administrator needs to plan which physical ports switch packets with the virtual machine by using the vSwitch technology, and which physical ports switch packets with the virtual machine by using the SR-IOV technology. However, this is inflexible due to a lack of dynamic adjustment to the plan. For example, after the vSwitch technology is used between some physical ports and the virtual machine, if no packet needs to be switched by using the vSwitch technology, the physical ports cannot be used. Consequently, a waste of the physical ports is caused.

In an embodiment of this disclosure, a resource occupied by the vSwitch on the server may be dynamically adjusted, to improve resource utilization on the server.

A resource adjustment method in the embodiment of this disclosure is described below with reference to an accompanying drawing.

Figure 2:
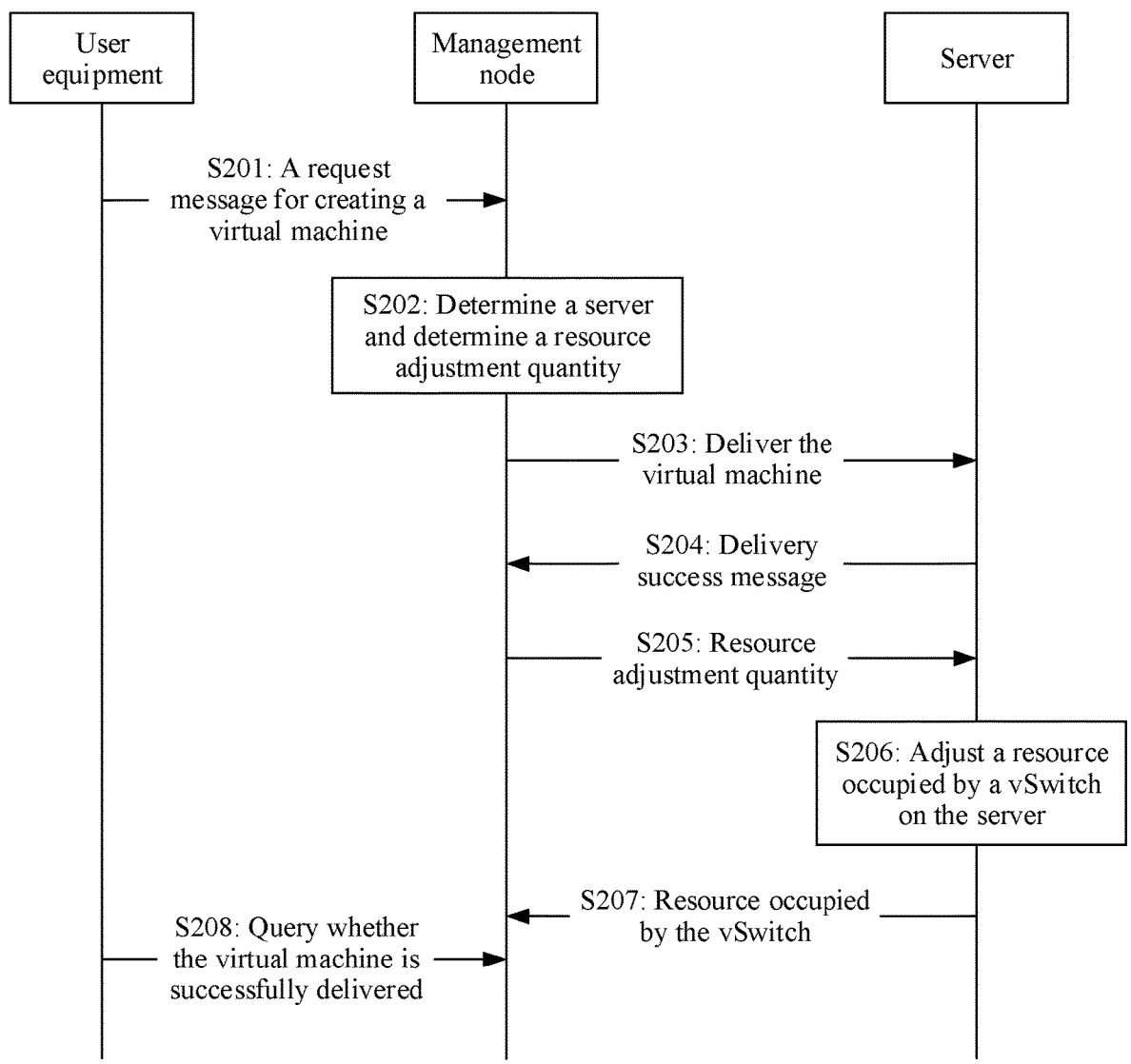
FIG. 2 is a schematic diagram of a resource adjustment method according to an embodiment of this disclosure.

FIG. 2 shows a resource adjustment method 200 according to an embodiment of this disclosure. For example, the method 200 may be jointly performed by the user equipment, the management node, and the server in FIG. 1. The method 200 includes the following steps.

S201. The user equipment delivers a request message for creating a virtual machine (for example, a first virtual machine may be created) to the management node. For example, the request message carries a specification of a virtual machine to be created. If the request message carries a specification of one 2 vCPU 2 Gbps (2U2G) virtual machine to be created, one virtual port is required, and a bandwidth needs to be increased by 2 Gbps.

S202. The management node determines the server, and the management node also determines a resource adjustment quantity in a process of determining the server.

When a virtualization platform or a cloud platform is established, a plurality of servers is deployed. Therefore, when a virtual machine needs to be created, there is a requirement for determining whether total resources (for example, including a CPU resource, a memory resource, and a bandwidth resource) of the server are enough for a resource occupied by the virtual machine when the virtual machine is created and a resource required by a vSwitch when the virtual machine is created. A resource currently occupied by the server is a, a resource that is required by the vSwitch and that needs to be increased when a 2U2G virtual machine is created is b (in this case, b is the resource adjustment quantity), and a resource that needs to be occupied by the virtual machine when the 2U2G virtual machine is created is c.

If the total resources of the server are enough for a+b+c, the virtual machine can be created on the server, and the server can be used as a target server. If the total resources of the server are not enough for a+b+c, filtering continues to be performed until another server is determined as a target server.

It should be noted that the total resources of the server are enough for the resource occupied by the virtual machine when the virtual machine is created and the resource that needs to be occupied by the vSwitch when the virtual machine is created. It should be understood that the CPU resource, the memory resource, and the bandwidth resource of the server are all enough for the resource occupied by the virtual machine when the virtual machine is created and the resource that needs to be occupied by the vSwitch when the virtual machine is created.

The following describes how to determine the resource adjustment quantity b.

The management node obtains a first resource currently occupied by the vSwitch on the server. When the virtual machine is created on the server, the management node determines a second resource to be occupied by the vSwitch on the server. The management node determines the resource adjustment quantity based on the first resource and the second resource. The vSwitch on the server already occupies the first resource. When the virtual machine needs to be created, the management node determines the second resource occupied by the vSwitch on the server, and the management node calculates the resource adjustment quantity b based on the first resource and the second resource.

Optionally, that the management node determines a second resource to be occupied by the vSwitch on the server includes: determining, based on a mapping relationship, the second resource occupied by the vSwitch on the server when the virtual machine is created on the server, where the mapping relationship is used to indicate a correspondence between the resource occupied by the vSwitch and a performance parameter of the vSwitch, for example, the performance parameter of the vSwitch is a forwarding performance improvement ratio or a delay reduction ratio. For example, when the virtual machine is created, there is a correspondence between an expected performance parameter of the vSwitch and the resource occupied by the vSwitch. For example, the correspondence is that a performance parameter 1 of the vSwitch corresponds to a resource 1, a performance parameter 2 of the vSwitch corresponds to a resource 2, and a performance parameter 3 of the vSwitch corresponds to a resource 3. If the expected performance parameter of the vSwitch is a system performance parameter 2 when two virtual ports are created, the second resource may be determined to be the resource 2.

Example 1: The mapping relationship may be a preset geometric procession algorithm. A quantity of CPU cores that are occupied by the vSwitch and that are of the server and forwarding performance of the vSwitch form a common ratio relationship. The relationship is as follows:

$$S_n = \frac{a_1(1 - x^n)}{1 - x} => n = \log_x\left(1 - \frac{S_n(1 - x)}{a_1}\right)$$

$a_1$ represents performance of a CPU core (or a vCPU), x represents a forwarding performance improvement ratio of the vSwitch (for example, the foregoing system performance parameter is the forwarding performance improvement ratio), and n represents a quantity of CPU cores (or vCPUs) required according to a requirement that the forwarding performance ratio is x, and $S_n$ represents a total used bandwidth. For example, when the performance improvement ratio x is 0.8, the performance of a CPU is 3000 megabits per second (3 Gbps). When the total used bandwidth $S_n$ is 8 Gbps, n is 3.4, and a value obtained after 3.4 is rounded up is 4. To achieve the performance improvement ratio of 0.8, four CPU cores (or vCPUs) are required, when the foregoing system performance parameter is 0.8, the required second resource is equivalent to four CPU cores (or vCPUs).

Example 2: The mapping relationship may be that 1 vCPU corresponds to 2 Gbps, 2 vCPUs correspond to 4 Gbps, and 3 vCPUs correspond to 5.5 Gbps. For example, to achieve the forwarding performance of 4 Gbps, the required second resource is equivalent to 2 vCPUs.

It should be noted that the resource adjustment quantity in this embodiment of this disclosure may have a function of indicating to increase the resource occupied by the vSwitch and a function of reducing the resource occupied by the vSwitch. For example, if the resource adjustment quantity is equivalent to 2 vCPUs, it indicates that the server needs to increase the resource occupied by the vSwitch by 2 vCPUs. For another example, if the resource adjustment quantity is −2 vCPUs, it indicates that the server needs to reduce the resource occupied by the vSwitch by 2 vCPUs. Optionally, the resource adjustment quantity may not have a function of indicating to increase the resource occupied by the vSwitch but has a function of reducing the resource occupied by the vSwitch. The management node needs to further indicate, by using the indication information, the server to increase or decrease the resource occupied by the vSwitch. For example, if the resource adjustment quantity is equivalent to 2 vCPUs, the indication information is used to indicate to increase the resource occupied by the vSwitch, the server increases the resource occupied by the vSwitch by 2 vCPUs. For another example, if the resource adjustment quantity is equivalent to 2 vCPUs, the indication information is used to indicate to decrease the resource occupied by the vSwitch, the server decreases the resource occupied by the vSwitch by 2 vCPUs.

It should also be noted that the resource adjustment quantity may be defined as a difference between the second resource and the first resource. If the virtual port needs to be created, the second resource is greater than the first resource. In this case, the resource adjustment quantity is positive, indicating that the resource occupied by the vSwitch needs to be increased. If the virtual port needs to be deleted, when the second resource is smaller than the first resource, the resource adjustment quantity is negative, indicating that the resource occupied by the vSwitch needs to be reduced.

Certainly, the resource adjustment quantity may also be defined as the difference between the first resource and the second resource. If the virtual port needs to be created, the second resource is greater than the first resource. In this case, the resource adjustment quantity is negative, indicating that the resource occupied by the vSwitch needs to be increased. If the virtual port needs to be deleted, when the second resource is smaller than the first resource, the resource adjustment quantity is positive, indicating that the resource occupied by the vSwitch needs to be reduced. Therefore, a definition of the resource adjustment quantity is not limited in this embodiment of this disclosure.

S203. The management node delivers the virtual machine to the server determined in S202, when delivering the virtual machine, the management node may deliver a specification of the virtual machine, for example, deliver a 2U2G virtual machine.

S204: The server sends a delivery success message to the management node, where the delivery success message is used to indicate that the virtual machine is successfully delivered.

S205. The management node sends the resource adjustment quantity to the server, and the server receives the resource adjustment quantity sent by the management node.

It should be noted that there is no limitation on a sequence of step S203 and step S205, and step S203 may be performed before, after, or simultaneously with step S205.

S206. The server adjusts, based on the resource adjustment quantity, the resource occupied by the vSwitch on the server.

S207. The server sends the resource currently occupied by the vSwitch to the management node, so that the management node determines whether the resource occupied by the vSwitch meets an expectation.

S208. The user equipment may query from the management node whether the virtual machine is successfully delivered.

It should be noted that, in the method 200, only a process of creating the virtual machine is simply described, and a process of deleting the virtual machine is similar to the process in the method 200. When the virtual machine is deleted, there is no need for determining whether total resources of the target server meet a requirement. In other words, step S202 is skipped, provided that the target server from which the virtual machine needs to be deleted is found and the resource adjustment quantity is sent to the target server. Details are not described herein again in order to avoid repetition.

It should be noted that, in the method 200, only creating the virtual machine is used as an example for description. When the virtual machine or the virtual port is created or deleted on the server, the resource occupied by the vSwitch may change. The virtual port needs to be created when the virtual machine is created. The virtual port needs to be deleted when the virtual machine is deleted on the server. The virtual port may be created or deleted when the virtual port on the virtual machine needs to be dynamically adjusted. This embodiment of this disclosure is applicable to a case in which the virtual machine is created, the virtual port is created, the virtual machine is deleted, or the virtual port is deleted on the server. A procedure in which the virtual port needs to be created, the virtual machine needs to be deleted, or the virtual port needs to be deleted is similar to a procedure in the method 200, and details are not described herein.

The foregoing describes in detail the resource adjustment method provided in this embodiment of this disclosure with reference to FIG. 2. The following describes in detail a resource adjustment apparatus provided in embodiments of this disclosure with reference to FIG. 3 and FIG. 4.

Figure 3:
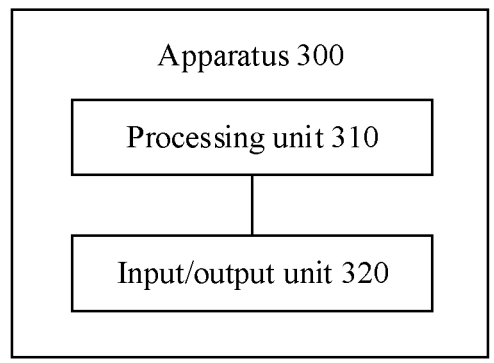
FIG. 3 is a schematic block diagram of a resource adjustment apparatus according to an embodiment of this disclosure.

FIG. 3 is a schematic block diagram of a resource adjustment apparatus 300 according to an embodiment of this disclosure. The apparatus 300 may correspond to the management node described in the foregoing method, or may correspond to a chip or a component of the management node. Each module or unit in the apparatus 300 may be configured to perform each action or processing process performed by the management node in the foregoing method. As shown in FIG. 3, the resource adjustment apparatus 300 may include a processing unit 310 and an input/output unit 320.

The processing unit 310 is configured to determine a resource adjustment quantity when a first virtual port is created or a second virtual port is deleted on a server, where the resource adjustment quantity is a to-be-adjusted value of a resource occupied by a vSwitch on the server, the first virtual port is a to-be-created virtual port between the vSwitch and a first virtual machine, the second virtual port is a to-be-deleted virtual port between the vSwitch and a second virtual machine on the server, and the first virtual machine is an existing virtual machine on the server or a to-be-created virtual machine on the server.

The input/output unit 320 is configured to send the resource adjustment quantity to the server.

In an optional embodiment, the processing unit 310 is configured to: obtain a first resource currently occupied by the vSwitch on the server; determine a second resource to be occupied by the vSwitch on the server when the first virtual port is created or the second virtual port is deleted on the server; and determine the resource adjustment quantity based on the first resource and the second resource.

In an optional embodiment, the first virtual machine is the to-be-created virtual machine on the server, and the processing unit 310 is further configured to: before determining the resource adjustment quantity based on the first resource and the second resource, determine that total resources of the server are enough for a resource occupied by the first virtual machine when the first virtual machine is created and a resource occupied by the vSwitch when the first virtual machine is created.

In an optional embodiment, the processing unit 310 is configured to: when the first virtual port is created or the second virtual port is deleted on the server, determine, based on a mapping relationship, the second resource occupied by the vSwitch on the server, where the mapping relationship is used to indicate a correspondence between the resource occupied by the vSwitch and a performance parameter of the vSwitch.

In an optional embodiment, the server supports an SR-IOV network technology.

It should be understood that for a process of performing the foregoing corresponding steps by the units in the apparatus 300, refer to the foregoing description of the method embodiment in FIG. 2. For brevity, details are not described herein again.

Figure 4:
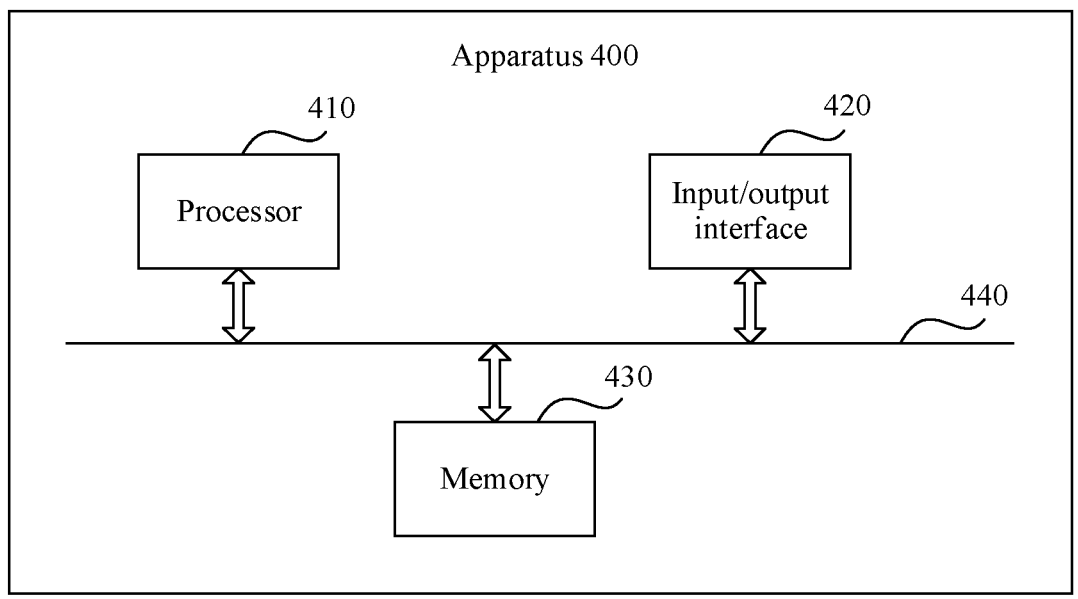
FIG. 4 is a schematic block diagram of another resource adjustment apparatus according to an embodiment of this disclosure.

As shown in FIG. 4, an embodiment of this disclosure provides a schematic block diagram of a resource adjustment apparatus 400. For example, the apparatus 400 may be the management node in FIG. 1. The apparatus 400 includes a processor 410, an input/output interface 420, a memory 430, and a bus 440.

It should be understood that the processor 410 in the resource adjustment apparatus 400 shown in FIG. 4 may correspond to the processing unit 310 in the resource adjustment apparatus 300 in FIG. 3. The input/output interface 420 in the resource adjustment apparatus 400 may correspond to the input/output unit 320 in the resource adjustment apparatus 300.

The processor 410 may be connected to the memory 430. The memory 430 may be configured to store program code and data. Therefore, the memory 430 may be a storage unit in the processor 410, an external storage unit independent of the processor 410, or a component including the storage unit in the processor 410 and the external storage unit independent of the processor 410.

Optionally, the apparatus 400 may further include the bus 440. The memory 430 and the input/output interface 420 may be connected to the processor 410 via the bus 440. The bus 440 may be a Peripheral Component Interconnect (PCI) bus, an Extended Industry Standard Architecture (EISA) bus, or the like. The bus 440 may be classified into an address bus, a data bus, a control bus, and the like. For ease of representation, only one line is used to represent the bus in FIG. 4, but this does not mean that there is only one bus or only one type of bus.

It should be understood that in this embodiment of this disclosure, the processor 410 may be a CPU. The processor may be further a general purpose processor, a digital signal processor (DSP), an application-specific integrated circuit (ASIC), a field-programmable gate array (FPGA) or another programmable logic device, discrete gate or transistor logic device, discrete hardware component, or the like. The general-purpose processor may be a microprocessor, or the processor may be any conventional processor, or the like. Alternatively, the processor 410 is configured to execute a related program by using one or more integrated circuits, to implement technical solutions provided in embodiments of this disclosure.

The memory 430 may include a read-only memory and a random-access memory (RAM), and provide instructions and data to the processor 410. A part of the memory 430 may further include a non-volatile RAM. For example, the memory 430 may further store information about a device type.

When the apparatus 400 runs, the processor 410 executes computer executable instructions in the memory 430 to perform the operation steps of the method 200 via the apparatus 400.

It should be understood that the apparatus 400 according to an embodiment of this disclosure may correspond to the apparatus 300 in an embodiment of this disclosure, and the foregoing and other operations and/or functions of the units in the apparatus 400 are intended to implement corresponding procedures in the method. For brevity, details are not described herein again.

Optionally, in some embodiments, an embodiment of this disclosure further provides a computer-readable medium. The computer-readable medium stores program code. When the computer program code is run on a computer, the computer is enabled to perform the methods in the foregoing aspects.

Optionally, in some embodiments, an embodiment of this disclosure further provides a computer program product. The computer program product includes computer program code. When the computer program code is run on a computer, the computer is enabled to perform the methods in the foregoing aspects.

All or some of the foregoing embodiments may be implemented by using software, hardware, firmware, or any combination thereof. When the software is used to implement the embodiments, all or some of the foregoing embodiments may be implemented in a form of a computer program product. The computer program product includes one or more computer instructions. When the computer program instructions are loaded or executed on the computer, the procedures or functions according to embodiments of this disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a web site, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, like a server or a data center, integrating one or more usable media. The usable medium may be a magnetic medium (for example, a floppy disk, a hard disk, or a magnetic tape), an optical medium (for example, a digital versatile disc (DVD)), or a semiconductor medium. The semiconductor medium may be a solid-state drive (SSD).

It should be understood that sequence numbers of the foregoing processes do not mean execution sequences in various embodiments of this disclosure. The execution sequences of the processes should be determined based on functions and internal logic of the processes, but should not be construed as any limitation on the implementation processes in embodiments of this disclosure.

Persons of ordinary skill in the art may be aware that, in combination with the examples described in embodiments disclosed in this specification, units and algorithm steps may be implemented by using electronic hardware or a combination of computer software and electronic hardware. Whether the functions are performed by hardware or software depends on particular applications and design constraints of the technical solutions. Persons skilled in the art may use different methods to implement the described functions for each particular application, but it should not be considered that the implementation goes beyond the scope of this disclosure.

It may be clearly understood by persons skilled in the art that, for the purpose of convenient and brief description, for a detailed working process of the foregoing system, apparatus, and unit, refer to a corresponding process in the foregoing method embodiments. Details are not described herein again.

In the several embodiments provided in this disclosure, it should be understood that the disclosed system, apparatus and method may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one location, or may be distributed on a plurality of network units. Some or all of the units may be selected based on an actual requirement to achieve the objectives of the solutions in embodiments.

In addition, functional units in embodiments of this disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this disclosure essentially, or the part contributing to the conventional technology, or some of the technical solutions may be implemented in a form of a software product. The computer application product is stored in a storage medium, and includes several instructions for enabling a computer device (which may be a personal computer, a server, or a network device) to perform all or some of the steps of the methods described in embodiments of this disclosure. The foregoing storage medium includes any medium that can store program code, for example, a Universal Serial Bus (USB) flash drive, a removable hard disk, a read-only memory (ROM), a RAM, a magnetic disk, or an optical disc.

The foregoing descriptions are merely specific implementations of this disclosure, but are not intended to limit the protection scope of this disclosure. Any variation or replacement readily figured out by persons skilled in the art within the technical scope disclosed in this disclosure shall fall within the protection scope of this disclosure. Therefore, the protection scope of this disclosure shall be subject to the protection scope of the claims.

What is claimed is:

1. A resource adjustment method implemented by a resource adjustment apparatus, the resource adjustment method comprising:
   obtaining a first resource currently occupied by a virtual switch (vSwitch) on a server, wherein the vSwitch comprises first virtual ports and is configured to communicatively couple the first virtual ports to a physical port of the server;
   obtaining a second resource to be occupied by the vSwitch on the server when creating a second virtual port on the server or deleting one of the first virtual ports from the server;
   calculating, based on the first resource currently occupied by the vSwitch on the server and the second resource to be occupied by the vSwitch on the server, a resource adjustment quantity when creating the second virtual port on the server or deleting the one of the first virtual ports from the server, wherein the resource adjustment quantity is a to-be-adjusted value of a third resource occupied by the vSwitch on the server, wherein the second virtual port is a to-be-created virtual port between the vSwitch and a first virtual machine, wherein the one of the first virtual ports is a to-be-deleted virtual port between the vSwitch and a second virtual machine on the server, and wherein the first virtual machine is an existing virtual machine on the server or a to-be-created virtual machine on the server; and
   sending the resource adjustment quantity to the server.

2. The resource adjustment method of claim 1, wherein the first virtual machine is the to-be-created virtual machine on the server, and wherein before calculating the resource adjustment quantity, the resource adjustment method further comprises identifying that total resources of the server meet requirements for a fourth resource occupied by the first virtual machine when the first virtual machine is created and a fifth resource occupied by the vSwitch when the first virtual machine is created.

3. The resource adjustment method of claim 1, wherein obtaining the second resource comprises obtaining, based on a mapping relationship, the second resource when creating the second virtual port or deleting the one of the first virtual ports on the server, and wherein the mapping relationship indicates a correspondence between the third resource and a performance parameter of the vSwitch.

4. The resource adjustment method of claim 1, wherein the server supports a single-root input/output virtualization (SR-IOV) network technology.

5. The resource adjustment method of claim 1, wherein the third resource comprises a processing resource of the server.

6. The resource adjustment method of claim 1, wherein the third resource comprises a memory resource of the server.

7. The resource adjustment method of claim 1, wherein the third resource comprises a bandwidth resource of the server.

8. The resource adjustment method of claim 1, wherein the resource adjustment quantity is configured to instruct the server to adjust the third resource occupied by the vSwitch on the server.

9. A resource adjustment apparatus, comprising:
   a memory configured to store instructions; and
   a processor coupled to the memory and configured to execute the instructions to cause the resource adjustment apparatus to:
      obtain a first resource currently occupied by a virtual switch (vSwitch) on a server, wherein the vSwitch comprises first virtual ports and is configured to communicatively couple the first virtual ports to a physical port of the server;
      obtain a second resource to be occupied by the vSwitch on the server when creating a second virtual port on the server or deleting one of the first virtual ports from the server;
      calculate, based on the first resource currently occupied by the vSwitch on the server and the second resource to be occupied by the vSwitch on the server, a resource adjustment quantity when creating the second virtual port on the server or deleting the one of the first virtual ports from the server, wherein the resource adjustment quantity is a to-be-adjusted value of a third resource occupied by the vSwitch on the server, wherein the second virtual port is a to-be-created virtual port between the vSwitch and a first virtual machine, wherein the one of the first virtual ports is a to-be-deleted virtual port between the vSwitch and a second virtual machine on the server, and wherein the first virtual machine is an existing virtual machine on the server or a to-be-created virtual machine on the server; and
      send the resource adjustment quantity to the server.

10. The resource adjustment apparatus of claim 9, wherein the first virtual machine is the to-be-created virtual machine, and wherein before calculating the resource adjustment quantity, the processor is further configured to execute the instructions to cause the resource adjustment apparatus to identify that total resources of the server meet requirements for a fourth resource occupied by the first virtual machine when the first virtual machine is created and a fifth resource occupied by the vSwitch when the first virtual machine is created.

11. The resource adjustment apparatus of claim 9, wherein the processor is further configured to execute the instructions to cause the resource adjustment apparatus to obtain, based on a mapping relationship, the second resource when creating the second virtual port or deleting the one of the first virtual ports on the server, and wherein the mapping relationship indicates a correspondence between the third resource and a performance parameter of the vSwitch.

12. The resource adjustment apparatus of claim 9, wherein the server supports a single-root input/output virtualization (SR-IOV) network technology.

13. The resource adjustment apparatus of claim 9, wherein the third resource comprises a processing resource of the server.

14. The resource adjustment apparatus of claim 9, wherein the third resource comprises a memory resource of the server.

15. The resource adjustment apparatus of claim 9, wherein the third resource comprises a bandwidth resource of the server.

16. The resource adjustment apparatus of claim 9, wherein the resource adjustment quantity is configured to instruct the server to adjust the third resource occupied by the vSwitch on the server.

17. A computer program product comprising computer-executable instructions stored on a non-transitory computer-readable storage medium that, when executed by a processor, cause a resource adjustment apparatus to:
  obtain a first resource currently occupied by a virtual switch (vSwitch) on a server, wherein the vSwitch comprises first virtual ports and is configured to communicatively couple the first virtual ports to a physical port of the server;
  obtain a second resource to be occupied by the vSwitch on the server when creating a second virtual port on the server or deleting one of the first virtual ports from the server;
  calculate, based on the first resource currently occupied by the vSwitch on the server and the second resource to be occupied by the vSwitch on the server, a resource adjustment quantity when creating the second virtual port on the server or deleting one of the first virtual ports from the server, wherein the resource adjustment quantity is a to-be-adjusted value of a third resource occupied by the vSwitch on the server, wherein the second virtual port is a to-be-created virtual port between the vSwitch and a first virtual machine, wherein the one of the first virtual ports is a to-be-deleted virtual port between the vSwitch and a second virtual machine on the server, and wherein the first virtual machine is an existing virtual machine on the server or a to-be-created virtual machine on the server; and
  send the resource adjustment quantity to the server.

18. The computer program product of claim 17, wherein the third resource comprises a processing resource of the server.

19. The computer program product of claim 17, wherein the third resource comprises a memory resource of the server.

20. The computer program product of claim 17, wherein the third resource comprises a bandwidth resource of the server.

* * * * *